US008062132B2

(12) United States Patent
Yates, Jr. et al.

(10) Patent No.: US 8,062,132 B2
(45) Date of Patent: Nov. 22, 2011

(54) SUBSCRIPTION BASED SERVICES FOR CLOSED COMPUTING SYSTEMS

(75) Inventors: Ronnie Donnell Yates, Jr., Bothell, WA (US); Albert Sing Ho, Seattle, WA (US); Boyd Cannon Multerer, Seattle, WA (US); David Brian Mitchell, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 859 days.

(21) Appl. No.: 11/636,166

(22) Filed: Dec. 8, 2006

(65) Prior Publication Data
US 2008/0139314 A1    Jun. 12, 2008

(51) Int. Cl.
*G06F 17/00* (2006.01)
(52) U.S. Cl. ........................................ 463/40
(58) Field of Classification Search .......... 463/29, 463/40, 43
See application file for complete search history.

(56) References Cited

U.S. PATENT DOCUMENTS

| 7,452,278 | B2* | 11/2008 | Chen et al. ............ 463/42 |
| 7,455,590 | B2* | 11/2008 | Hansen et al. ............ 463/40 |
| 2001/0035814 | A1 | 11/2001 | Uchida |
| 2006/0031257 | A1 | 2/2006 | Lipscomb et al. |
| 2006/0123117 | A1 | 6/2006 | Heutchy et al. |
| 2007/0013515 | A1* | 1/2007 | Johnson et al. ............ 340/568.1 |
| 2008/0167127 | A1* | 7/2008 | Turkstra et al. ............ 463/40 |
| 2008/0167133 | A1* | 7/2008 | White et al. ............ 463/43 |
| 2009/0111576 | A1* | 4/2009 | Ostergren et al. ............ 463/29 |

OTHER PUBLICATIONS

PCT Application No. PCT/US2007/085067 : International Search Report and Written Opinion of the International Searching Authority, Apr. 28, 2008, 9 pages.

* cited by examiner

*Primary Examiner* — Ronald Laneau
(74) *Attorney, Agent, or Firm* — Woodcock Washburn LLP (57) ABSTRACT

A disclosure of a subscription service is provided, where this service allows for the running of unsigned content, such as games, on closed computing systems, such as gaming consoles. The subscription service checks whether gamer tags have an account to run unsigned games on any consoles on which the gamer tags happen to be residing. If so, users associated with such gamer tags can run unsigned content; if not, then they cannot (but may be asked or allowed to subscribe to the service). The subscription service has various facets, some of which include: gamer tags that can interact with the service while being distributed across a plurality of consoles; remote location of the service from the gaming console; user privileges auditing and revocation if users associated with gamer tags violate policies set out by the subscription service, and so on.

17 Claims, 10 Drawing Sheets

SUBSCRIPTION BASED SERVICES FOR CLOSED COMPUTING SYSTEMS

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2006, Microsoft Corp.

TECHNOLOGY FIELD

The present technology relates to the field of computing, and more particularly, to gaming environments.

BACKGROUND

Gaming systems are prevalent in today's computing environments. Game consoles are typically closed systems that only allow signed games controlled by hardware vendors to execute on such consoles. This restriction may be done for various reasons, whether to preserve the business model of having a tightly controlled environment for publishers, where piracy of intellectual property is kept to a minimum, or controlling the types games that can be played on a gaming system—for instance, to only allow the playing of content that meets parental expectations for children. Additionally, limiting content to signed code can help to control and mitigate the potential for cheating on games in an online community, where certain assumptions, such as community scores or digital currencies, are essential to be accurate.

However, these tight restrictions present on game consoles prevent the larger creative community as a whole from developing games or game-like applications on closed game consoles. Thus, it is important to allow developers, gamers, general hobbyist, and student game developer communities, among others, to write games for a traditionally closed system on their own computing devices, and then providing the ability to send any gaming content to the closed devices via some transport or communication mechanism. In providing these services, what is needed is a subscription service that can charge appropriate fees for users wanting to develop and/or use unsigned gaming content.

SUMMARY

A subscription service is disclosed herein, where this service allows for the running of unsigned content, such as games, on closed computing systems, such as gaming consoles. The subscription service checks whether gamer tags have an account to run unsigned games on any consoles on which the gamer tags happen to be residing. If so, users associated with such gamer tags can run unsigned content; if not, then they cannot (but may be asked or allowed to subscribe to the service).

In various exemplary and non-limiting aspects of the present disclosure, the gamer tags themselves can be distributed across a plurality of consoles; the subscription service can be remotely located from the gaming console; and, user privileges originally provided by gamer tag subscriptions can be subject to auditing and revocation if users associated with gamer tags violate policies set out by the subscription service. Various other aspects are disclosed in the Detailed Description.

Thus, it should be noted, that this Summary is provided to introduce a selection of concepts in a simplified and exemplary form, where such concepts are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the presently disclosed subject matter, various aspects of the disclosure are shown. However, the disclosure is not limited to the specific aspects discussed. The following figures are included.

DETAILED DESCRIPTION

Overview

Various aspects of the presently disclosed subject matter are presented in their corresponding sections of this Detailed Description. First, aspects of unsigned content in a closed system are discussed, providing context for any following aspects explained in detail in the remaining sections. Second, subscription services for closed systems are discussed, building on the disclosure of the first section. Third, an exemplary computing device is discussed, and fourth, a console environment is discussed, building on the disclosed computing device. The third and fourth aspects provide exemplary implementation details as to how a subscription service, disclosed in the second section, could be implemented in a computing, or more specifically, a gaming environment.

Aspects of Unsigned Content in a Closed System

In order to provide context for the present disclosure, this section focuses on the execution of unsigned content in a closed system in such a way that such execution is secure (i.e. such that resources in the closed system are protected). In order to gain a better appreciation for these aspects, it is instructive to compare them to the prior art.

Figure 1:
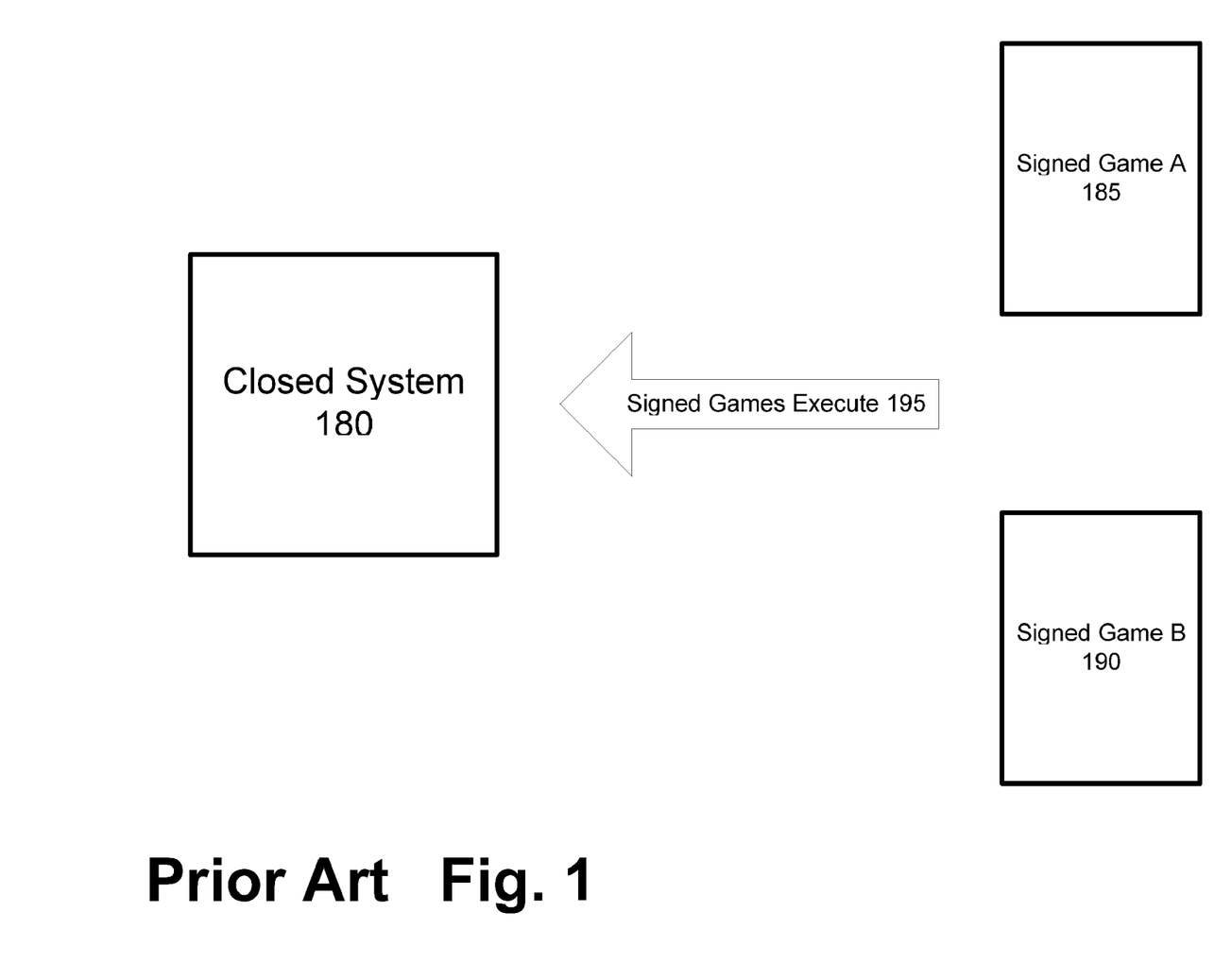
FIG. 1 illustrates a prior art system where only signed software components, namely, signed games, are able to run on a typically closed system.

FIG. 1 illustrates a prior art system where only signed software components, namely, signed games, are able to run on a typically closed system. Specifically, a closed system 180 is depicted against which various signed games, such as game A 185 and game B 190, are able to execute 195. These games 185, 196 are typically authorized by the closed system 180 manufacturer. However, in some aspects, they can be authorized by game developers or some other third parties. In any case, the system 180 is deemed "closed" in the sense that not every software program or application can run on it, as otherwise might be the case with a general purpose personal computer (a PC).

A typical signing process is well known in the art, and as was mentioned above, it serves a variety of purposes, such as limiting pirating of intellectual property and controlling who has access to the appropriate content. However, despite the numerous advantages of such a closed system 180, at times it unnecessarily restricts development of other "unsigned" games (games not officially authorized or sanctioned by a gaming authority). Such unsigned games can be games that are build on top of existing games (even "signed" games, if permission is obtained from a publisher of such signed games) or they may be newly developed games that could not otherwise run on a closed system.

Figure 2:
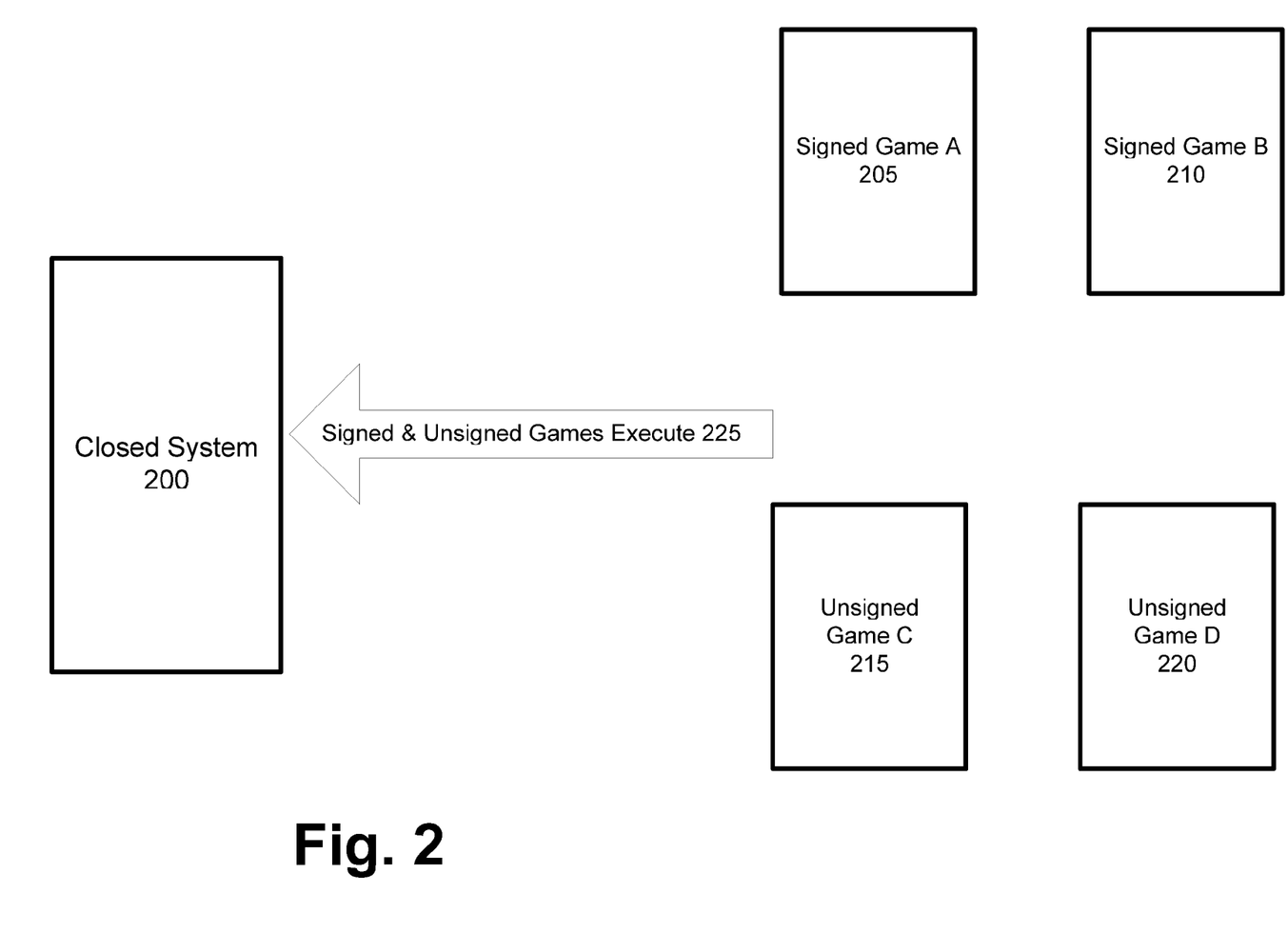
FIG. 2 illustrates a system where both signed and unsigned games are able to run on a closed system.

Thus, in contrast to FIG. 1, FIG. 2. illustrates a system where both signed and unsigned games are able to run on a closed system. A different closed system 200 vis-à-vis the closed system of FIG. 1, closed system 180, can run not only signed games A 205 and B 210, but also unsigned games C 215 and D 220. Although it should be noted, that the depicted closed systems 180 and 200 are merely exemplary and are not limited to any particular manufacturer or generation of computing device (abstract boxes for such system could have been shown instead of the concrete depictions in FIGS. 1 and 2). Thus, the illustrated systems 180 and 200 are merely exemplary and not limiting.

As was mentioned above, allowing unsigned gaming content C 215 and D 220 to run on a system 200 that typically does not allow unsigned content to run, expands gaming capabilities of such a system 200. However, allowance of running unsigned gaming content 215, 220 also presents security problems. Since games C 215 and D 220 are unsigned, i.e. they are not verified to be what they purport to be, malicious or undesired code and data can end up running on the gaming system 220. Thus, a security layer can be present to address this problem. And, moreover, this security layer can not only allow unsigned games to run in the first place, but also additionally it can have the benefit of preventing undesired code and data from interacting with gaming system 200 resources.

Figure 3:
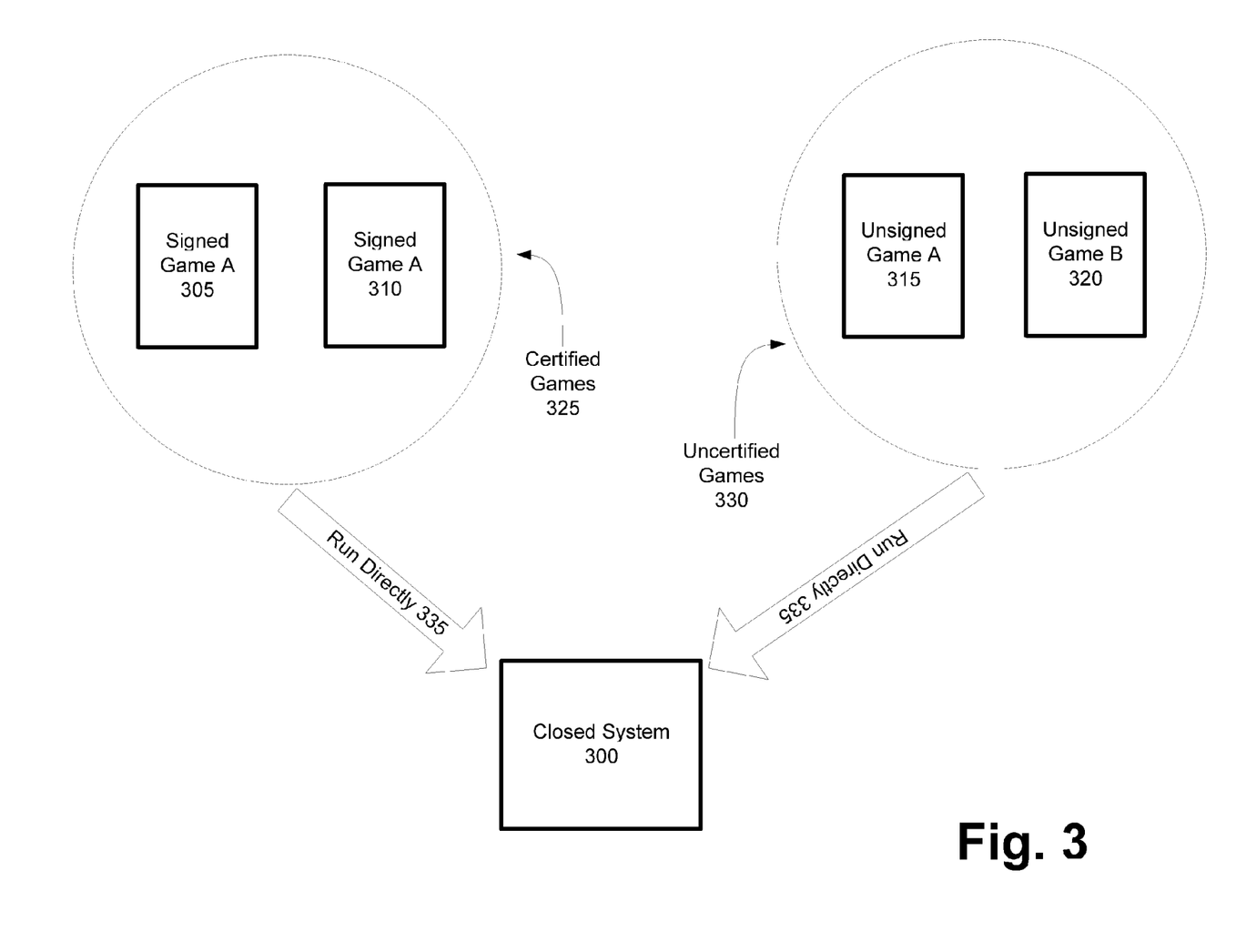
FIG. 3 illustrates that signed games are certified, and that unsigned games are not certified.

Next, FIG. 3 illustrates that signed games are certified, and that unsigned games are not certified. Specifically, games A 305 and B 310 are signed by some authentication or validation authority so that these games can run 335 on a specified closed system designated by the authority. Such signed games A 305 and B 310 are said to be certified 325. In contrast, uncertified games 330 are games that are not signed off by some such authority, namely, games A 315 and B 320, and so typically they cannot execute on the closed system 300. Given some implementation of the above and below aspects of the present disclosure, such games 315, 320 can run on the closed system 300 (in addition to the originally signed games A 305 and B 310).

Figure 4:
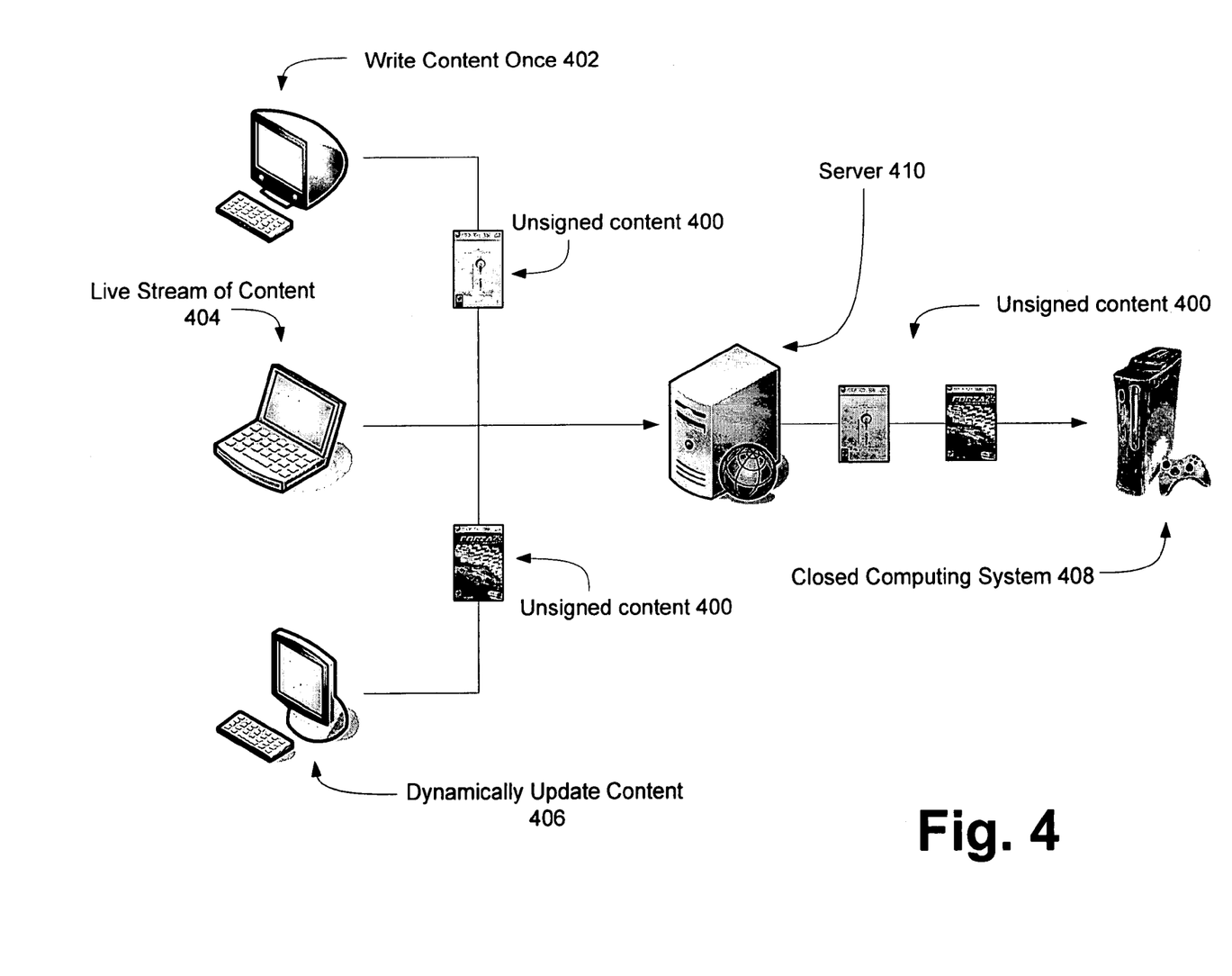
FIG. 4 illustrates that there is a myriad of ways in which unsigned content can be provided from some computing source to a closed system.

Lastly, there is a myriad of ways in which unsigned content can be provided from some computing system, device, or source to a closed system, device, or target, as is shown in FIG. 4. The types of content contemplated in this aspect can include content that is provided only once 402 via a communication mechanism associated with the closed computing system 408, content that is streamed 404 to the system 406 via the communication mechanism, or content that is periodically and dynamically 408 provided to the system 408 via the communication mechanism.

Various types of content providing architectures are contemplated herein. One type may have an intervening server 410 between the computing sources 402, 404, 406 and the closed system 408, while other types may have direct connection between a computing source and the closed system 408. The manner in which information is received, stored, and passed down to the system 408 can depend on the restrictions placed by system 408 manufacturers in the transport or communication layer associated with the communication mechanism. Thus, a transport layer can have various communication policy decisions for any given communication mechanism, such as a multi-channel transport mechanism.

Aspects of a Subscription Service for Closed Systems

Figure 5:
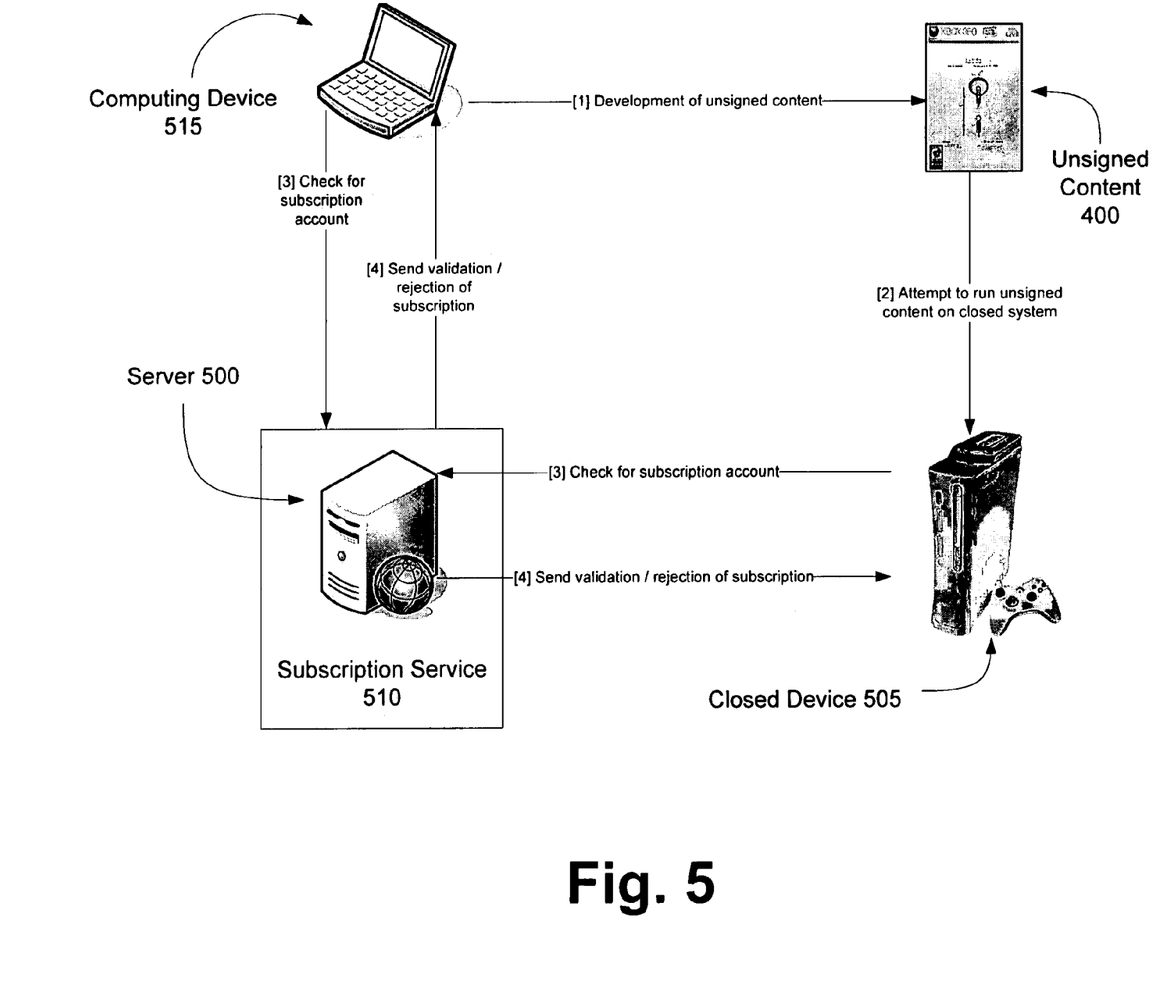
FIG. 5 illustrates a general architecture of a subscription service that may charge fees for developing and/or using unsigned gaming content.

In one aspect of the presently disclosed subject matter, FIG. 5 illustrates a general architecture of a subscription service that may charge fees for developing and/or using unsigned gaming content. Developers, gaming enthusiasts, or just about any computer users can use computing devices (whether open or closed computing devices) in order to develop unsigned content 400 that can be eventually run on closed devices, such as closed device 505.

However, by default, only signed (authorized) content can run on closed device 505. Thus, if there is an attempt to run unsigned content 400, the closed device 505 may first have to check whether a user wanting to run such unsigned content 400 is authorized to do so. In other words, the closed device 505 might perform a check whether the user has an account with some subscription service 510 allowing the user to run this game. If the answer is yes, then a validation (or if the answer is no, a rejection) can be sent from the subscription service 510 back to the closed device 505 allowing (or, alternatively, disallowing) the unsigned content 400 to execute on the closed device 505.

It should be noted that the architecture depicted in FIG. 5 is merely exemplary and non-limiting, since the subscription service 510 does not have to be located on some server 500 remote from the closed device 505. In some aspects of the presently disclosed subject matter, the subscription service 510 may be located on or near the closed device 505. In this scenario, information regarding subscription can be downloaded to the closed device 505, and the check for subscription account information and the corresponding validation or rejection response can be performed locally.

Additionally, a check for subscription can be made not only with respect to an inquiry of whether or not users can play developed unsigned games, as was discussed so far, but also whether individuals can develop unsigned games in the first place. Often times it will be the case that individuals will develop games on their own and will not need to perform such pre-development checking (and obtain validation), however in the cases where individuals are perhaps editing or enhancing signed, licensed, and/or copyrighted content, they may need to obtain permission for altering it first (before actually running it on the closed device 505). The present aspect envisions all the architectural permutations discussed with reference to FIG. 5 in any combination or alone.

Figure 6:
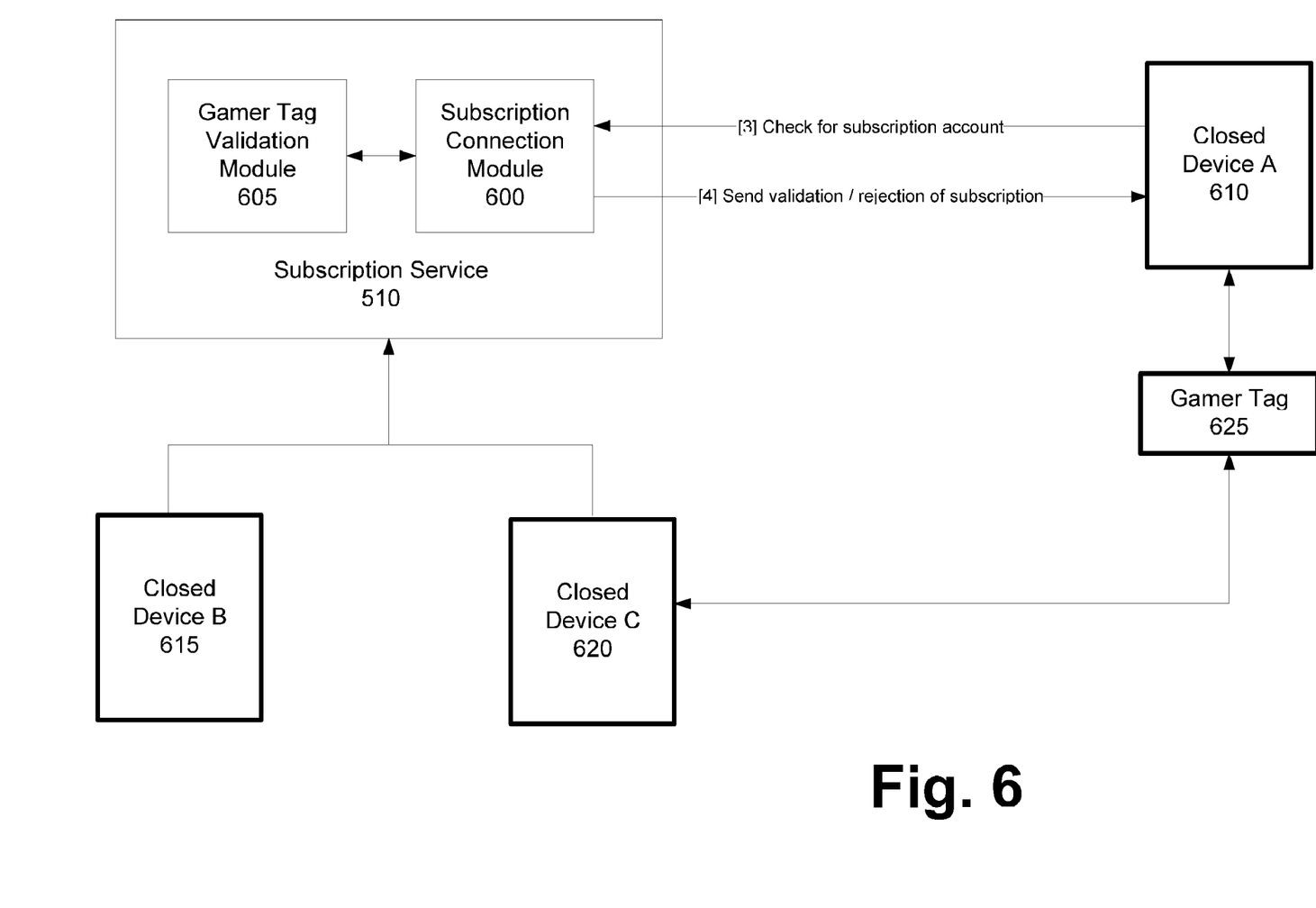
FIG. 6 illustrates, in one exemplary and non-limiting implementation, how a subscription service can check for and validate whether users can run and/or develop unsigned content.

Next, FIG. 6 illustrates, in one exemplary and non-limiting implementation, how a subscription service can check for and validate whether users can run and/or develop unsigned content. Per FIG. 6, a closed device A 610 can check for subscription account information with some subscription service 510. First of all, the subscription service 510 may have some subscription connection module 600 that allows the closed device A 610 to connect to the subscription service 510. This may be a modem, an Ethernet card, a wireless card, and so on. This connection module 600 can then connect the closed device A 610 to a gamer tag validation module 605.

The gamer tag validation module 605 can check whether a subscription account for running unsigned content exists for a particular gamer tag 625 associated with a closed device A 610 (e.g. a gamer tag 625 that is signed-in at closed device A 610). If a subscription fee has been paid by the user or owner of the gamer tag 625, then such as user or owner can run unsigned content on the closed device A 610. If a subscription fee has not been paid, then a notification can be provided to the closed device A 610 that permission for running the selected unsigned content has been denied (and, additionally, that only signed content can run).

Allowance or disallowance of running unsigned games on the closed device A 610 can be made on a flat-fee account basis (one time fee covers the running of any unsigned content), on a per-game basis (one time fee covers running of a particular unsigned content), on a per-use basis (pay on a per-use of content basis, e.g. pay by game title), or on a per-game session basis (pay for each game session, e.g. every time a user conducts a game session or logs-in to the subscription service 510). Any such fee payment schedule is contemplated in the present aspect of the disclosure, whether alone, in combination, or in conjunction with other fee schedules.

As is shown in FIG. 6, the gamer tag 625 can be used on various closed devices. For example, a gamer tag 625 can be used on a first device, closed device A 610, and on a second device, closed device C 620. The gamer tag 625 can be transferred between closed devices 610, 615, 620 via detachment of a console-associated hard drive, or it may be transferred electronically between consoles, such as closed devices 610, 615, 620. Thus, the subscription service 510 can authorize the running of unsigned content by a user or owner on any closed device the user or owner happens to be using.

In some aspects, the gamer tag 625 needs to be presented by each individual who plays any given game on a gaming console, in other words, it needs to be validated by the subscription service 510 for each individual who is associated with or plays an unsigned gaming content. Thus, another way of looking at this aspect of the presently disclosed subject matter, is to turn to FIG. 7, which illustrates that the subscription service limits the community of unsigned gaming content users to those users for whom there is a subscription account corresponding to a gamer tags of each user.

Figure 7:
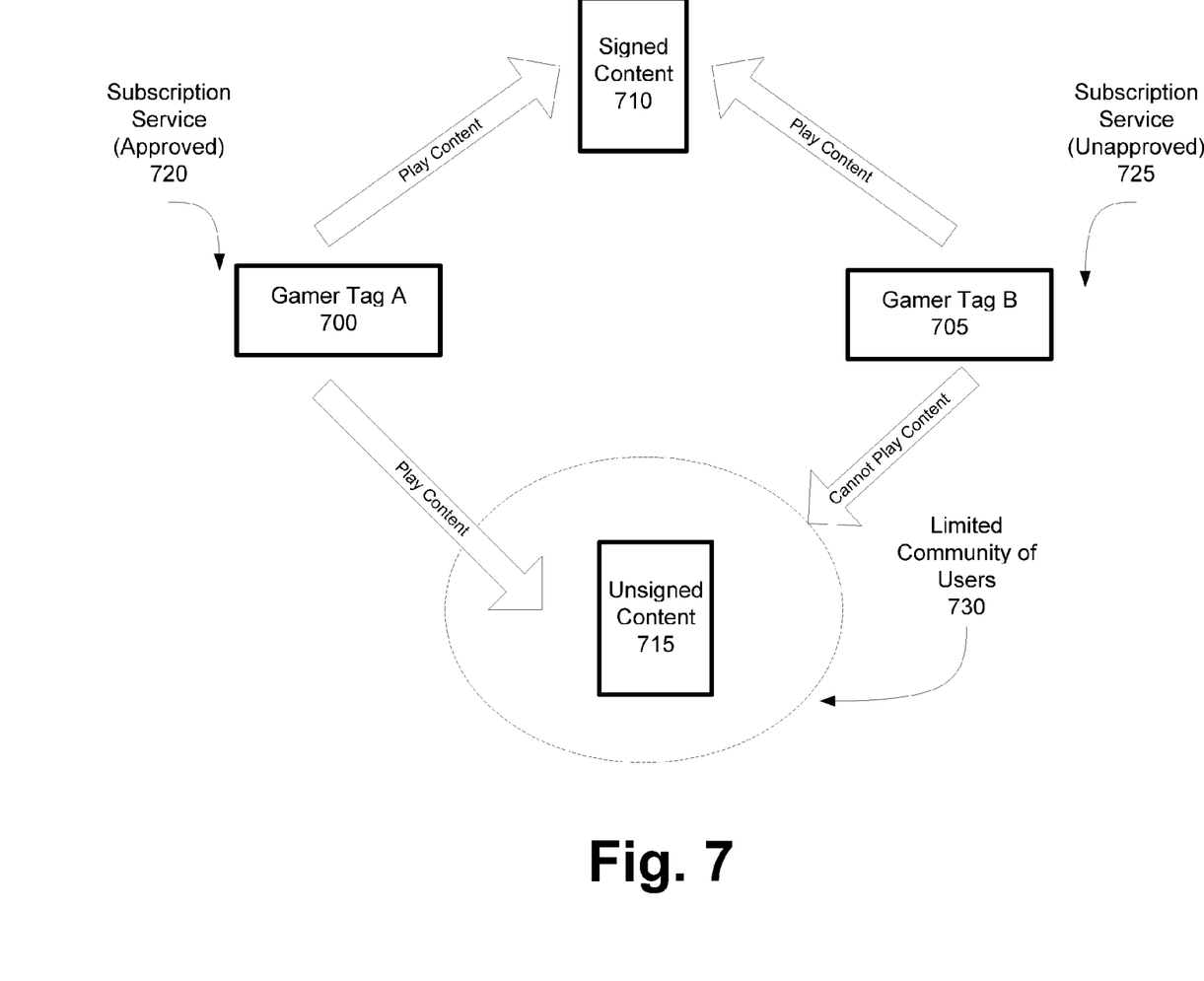
FIG. 7 illustrates that the subscription service limits the community of unsigned gaming content users to those users for whom there is a subscription account corresponding to a gamer tags of each user.

Specifically, FIG. 7 shows two gamer tags: gamer tag A 700 and gamer tag B 705. Gamer tag A 700 is approved by a subscription service 720. In other words, a user or owner of the gamer tag A 700 has paid a fee to the subscription service in order to have the option of playing unsigned games on an otherwise closed gaming system. In contrast to gamer tag A 700, gamer tag B 705 has not been approved by the subscription service 725 (the issue of whether there is one general subscription service or multiple subscription services that synchronize with each other is an implementation detail, contemplated by this aspect of the present disclosure).

Thus, in the nominal scenario where signed gaming content is played, both gamer tags 700, 705 can play such content on a closed system. For example, signed content 710 can be played by both gamer tag A 700 and gamer tag B 705. In contrast, only gamer tag A 700 can play the illustrated unsigned content 715, and gamer tag B 705 cannot play this unsigned content 715. The reason for this limitation is that the former gamer tag 700 has been approved by the aforementioned subscription service 720, whereas the latter gamer tag 705 has not been so approved 725. Thus, the subscription service creates a limited community of users 730 for unsigned content.

This limitation may be embodied in various different forms. For instance, the community of unsigned content users may be based on various heuristics, such as: age, if the content is somehow graphic or vulgar or requires parental approval; amount paid, depending how much users have paid and for what level of service; time, depending on an allotted amount of time users can use the unsigned content; level of play, ranging from novice to expert (it may be desirable to limit certain communities only to professional players or to novice players); privilege—access, where certain users can have more access than other users, as in the scenario where certain access may be for free (e.g. trial period access or shareware access) and greater access may have to be paid for, an so on. There are various heuristics that can be used to create the desired and limited community of users, as those of skill in the art will readily appreciate.

Figure 8:
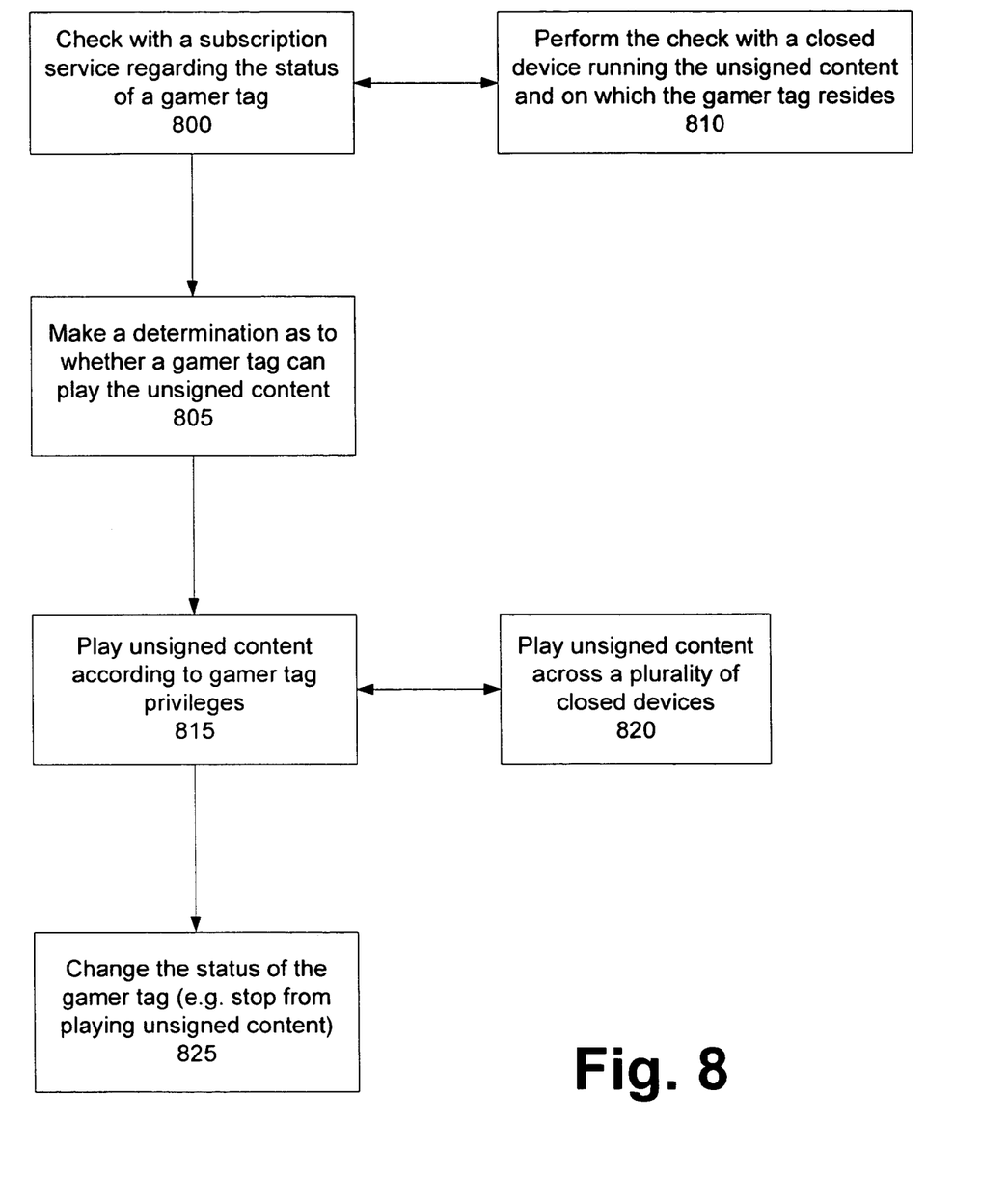
FIG. 8 illustrates in block diagram form an exemplary implementation of the presently disclosed subject matter in a flow chart, encompassing the aspects discussed, especially with reference to FIGS. 5-7.

Next, FIG. 8 illustrates in block diagram form some of the plurality of aspects discussed with reference to FIGS. 4-7. Thus, in FIG. 8, a general method is shown for maintaining a subscription service for playing unsigned content on closed devices. At block 800, a step is performed that checks with a subscription service as to whether a gamer tag has an account with the subscription service, where the account can specify whether the gamer tag can play unsigned content. This step is explained in great detail with reference to FIGS. 5 and 6. As is shown in block 810, the checking can be performed with a closed device on which the gamer tag resides, where the closed device is configured to run the unsigned content.

Then, at block 805, a step is performed that makes a determination as to whether the gamer tag can play the unsigned content. The determination can be made based on the various heuristics related to the content of said unsigned content and discussed above with reference to FIG. 7, above. Once this is performed, at block 815, the unsigned content can be actually played, and, it should be noted, as block 820 points out, the gamer tag can be configured to be used across a plurality of closed devices configured to run the unsigned content, not just any particular closed device. However, as block 825 shows, the determination regarding whether or not a gamer tag can play the unsigned content is subject to being changed by the subscription service upon an action of a user associated with said gamer tag, such as a user abusing subscription rights (e.g. pirating content, illegally distributing it, cheating, etc.). In short, the privilege to play unsigned content is subject to being revoked by the subscription service. The service, in other words, can maintain a tight control as to which users associated with gamer tags can and which cannot play the unsigned games.

Lastly, although this point is inherent in FIG. 8, it should be pointed out that the checking for subscription status can be performed before the unsigned content is played on a closed console. Alternatively, it can be performed during some time when the unsigned content is being run. This much is an implementation detail, and those of skill in the art will readily appreciated this and other related details, albeit not mentioned herein, are contemplated by the disclosed aspects of the present subject matter.

Exemplary Computing Device

Figure 9:
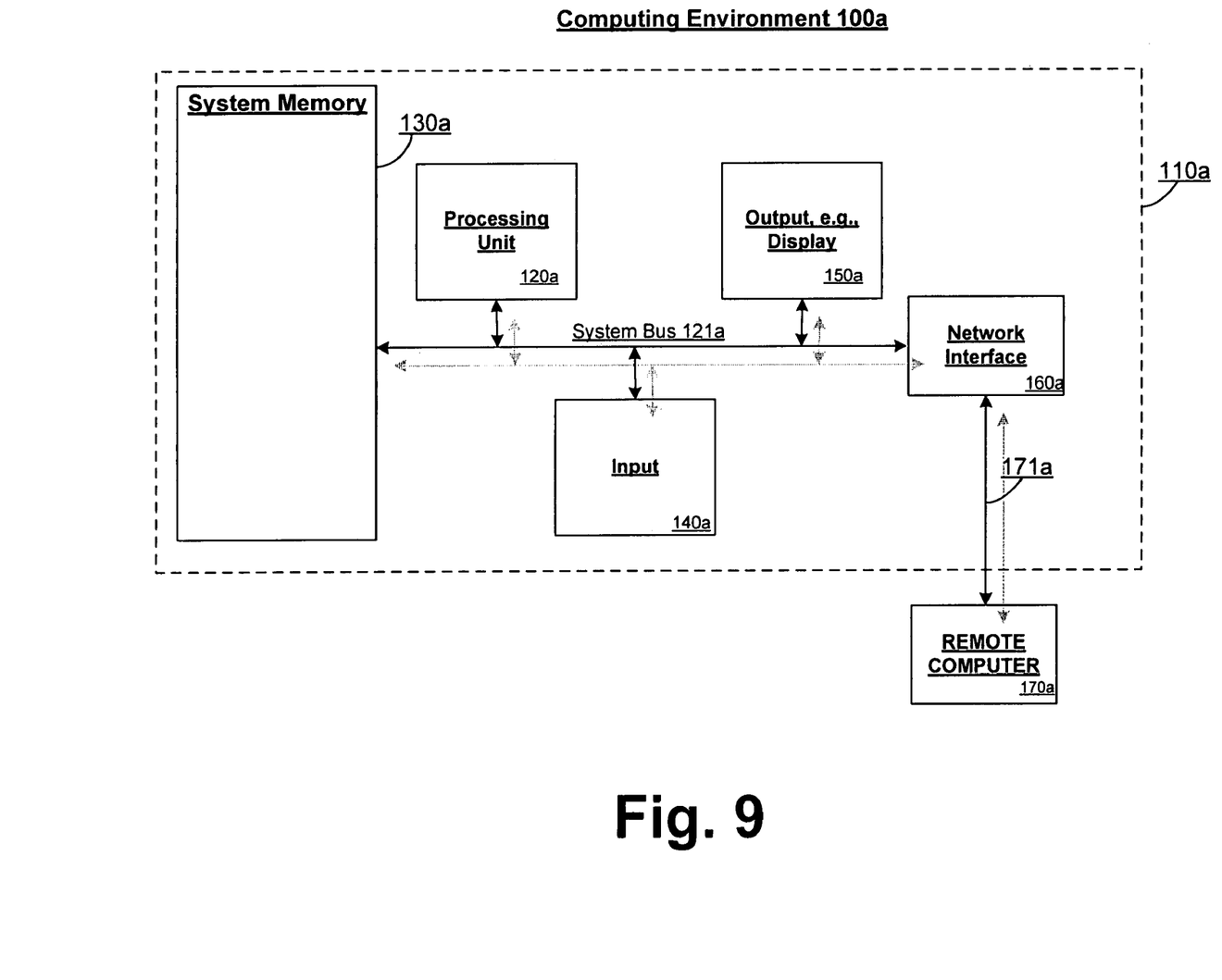
FIG. 9 illustrates a block diagram representing an exemplary non-limiting computing system environment on which signed or unsigned content can execute in accordance with the presently disclosed subscription service.

As mentioned, the presently disclosed subject matter applies to any device wherein it may be desirable to run unsigned content that is subject to run per policies and fees stipulated by a subscription service. It should be understood, however, as indicated above, that other equivalent content to that of unsigned content can work with presently disclosed subscription services. Accordingly, the below general purpose remote computer described below in FIG. 9 is but one example, and the present subscription service may interface with any client or portable device, whether standalone or having network/bus interoperability and interaction. Thus, the present subject matter may be implemented in an environment of networked hosted services in which very little or minimal client resources are implicated, e.g., a networked environment in which the client device serves merely as an interface to the network/bus, such as an object placed in an appliance.

Although not required, the present subject matter can be managed using an operating system, for use by a developer of services for a device or object, and/or included within application software that operates in connection with the present subject matter. Software may be described in the general context of computer-executable instructions, such as program modules, being executed by one or more computers, such as client workstations, servers or other devices. Those skilled in the art will appreciate that the present subject matter may be practiced with other computer system configurations and protocols.

FIG. 9 thus illustrates an example of a suitable computing system environment 100a in which the various aspects described with reference to FIGS. 2-8 may be implemented, although as made clear above, the computing system environment 100a is only one example of a suitable computing environment for execution device and is not intended to suggest any limitation as to the scope of use or functionality of these various aspects. Neither should the computing environment 100a be interpreted as having any dependency or requirement relating to any one or combination of components illustrated in the exemplary operating environment 100a.

With reference to FIG. 9, an exemplary remote device for interfacing with the aforementioned aspects includes a general purpose computing device in the form of a computer 110a. Components of computer 110a may include, but are not limited to, a processing unit 120a, a system memory 130a, and a system bus 121a that couples various system components including the system memory to the processing unit 120a. The system bus 121a may be any of several types of bus structures including a memory bus or memory controller, a peripheral bus, and a local bus using any of a variety of bus architectures.

Computer 110a typically includes a variety of computer readable media. Computer readable media can be any available media that can be accessed by computer 110a. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110a. Communication media typically embodies computer readable instructions, data structures, program modules or other data in a modulated data signal such as a carrier wave or other transport mechanism and includes any information delivery media. The above discussed subscription service can be stored in various such media.

The system memory 130a may include computer storage media in the form of volatile and/or nonvolatile memory such as read only memory (ROM) and/or random access memory (RAM). A basic input/output system (BIOS), containing the basic routines that help to transfer information between elements within computer 110a, such as during start-up, may be stored in memory 130a. Memory 130a typically also contains data and/or program modules that are immediately accessible to and/or presently being operated on by processing unit 120a. By way of example, and not limitation, memory 130a may also include an operating system, application programs, other program modules, and program data.

The computer 110a may also include other removable/non-removable, volatile/nonvolatile computer storage media. For example, computer 110a could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 121a through a non-removable memory interface such as an interface, and a magnetic disk drive or optical disk drive is typically connected to the system bus 121a by a removable memory interface, such as an interface.

In addition to a user being able to provide input to the closed computing device via controllers, a user may enter commands and information into the computer 110a through input devices such as a keyboard and pointing device, commonly referred to as a mouse, trackball or touch pad. In addition to such peripheral devices, other input devices may include a microphone, joystick, game pad, satellite dish, scanner, or the like. These and other input devices are often connected to the processing unit 120a through user input 140a and associated interface(s) that are coupled to the system bus 121a, but may be connected by other interface and bus structures, such as a parallel port, game port or a universal serial bus (USB). A graphics subsystem may also be connected to the system bus 121a. A monitor or other type of display device is also connected to the system bus 121a via an interface, such as output interface 150a, which may in turn communicate with video memory. In addition to a monitor, computers may also include other peripheral output devices such as speakers and a printer, which may be connected through output interface 150a. All these devices can aid users in experiencing the execution of unsigned content that is provided to a closed device as sanctioned by the subscription service.

The computer 110a may operate in a networked or distributed environment using logical connections to one or more other remote computers, such as remote computer 170a, which may in turn have media capabilities different from device 110a. The remote computer 170a may be a personal computer, a server, a router, a network PC, a peer device or other common network node, or any other remote media consumption or transmission device, and may include any or all of the elements described above relative to the computer 110a. The logical connections depicted in FIG. 9 include a network 171a, such local area network (LAN) or a wide area network (WAN), but may also include other networks/buses. Such networking environments are commonplace in homes, offices, enterprise-wide computer networks, intranets and the Internet.

When used in a LAN networking environment, the computer 110a is connected to the LAN 171a through a network interface or adapter. When used in a WAN networking environment, the computer 110a typically includes a modem or other means for establishing communications over the WAN, such as the Internet. A modem, which may be internal or external, may be connected to the system bus 121a via the user input interface of input 140a, or other appropriate mechanism. In a networked environment, program modules depicted relative to the computer 110a, or portions thereof, may be stored in a remote memory storage device. It will be appreciated that the network connections shown and described are exemplary and other means of establishing a communications link between the computers may be used. Thus, any of these and other means of communication can be the basis for establishing a communication link between closed and other computing system using the communication mechanism of FIGS. 5-8 and thus monitoring the subscription status of any user and his or her associated gamer tag.

Exemplary Multimedia (Closed) Console Environment

Figure 10:
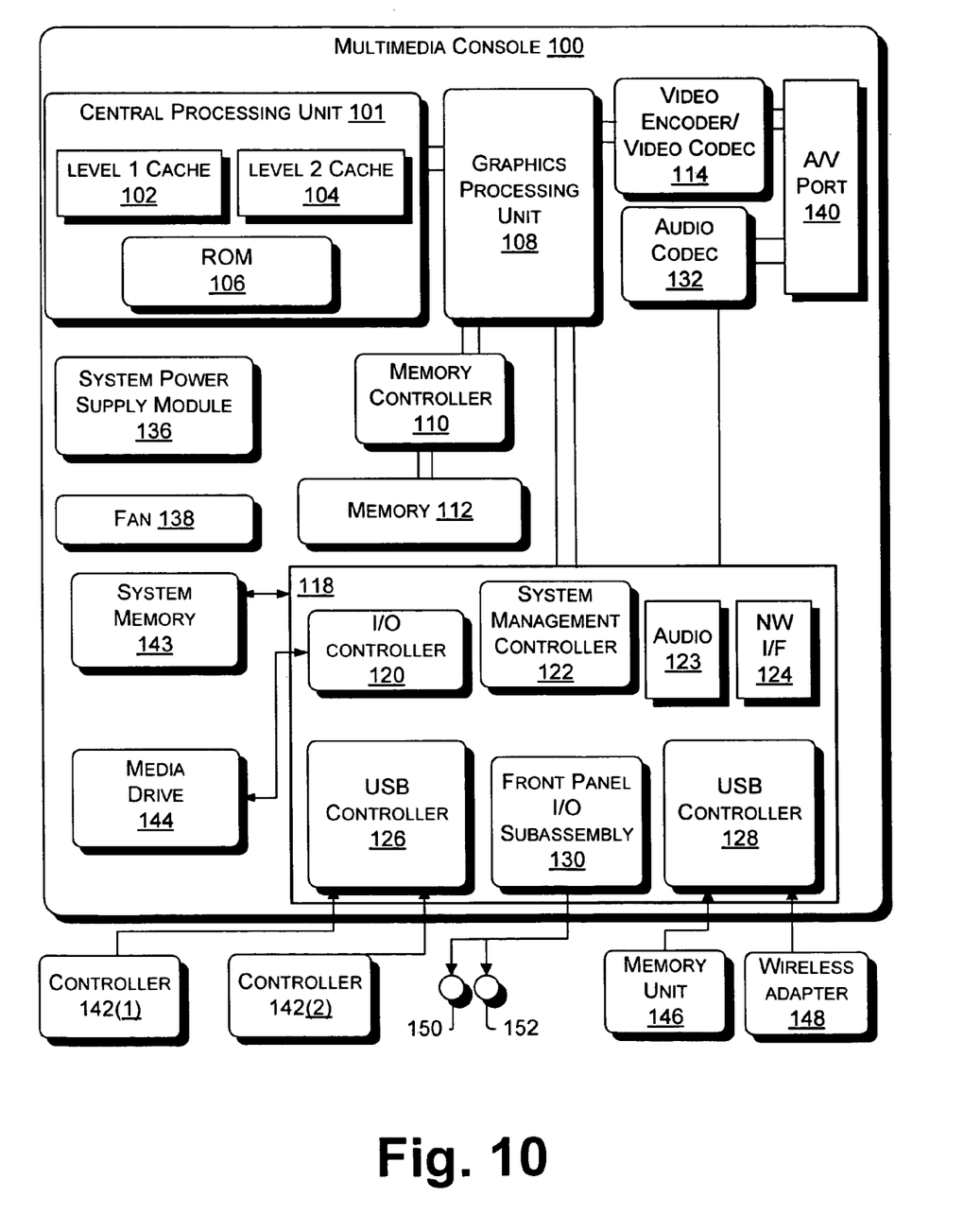
FIG. 10 illustrates a block diagram showing an exemplary non-limiting multimedia console device which may be used in the presently described subscription service.

Referring next to FIG. 10, shown is a block diagram illustrating another exemplary and non-limiting computing device, i.e., an exemplary multimedia console, which may be closed to a limited amount of software components being signed by some signing authority (whether the closed device maker or some gaming publisher). FIG. 10 shows the functional components of a multimedia console 100 in which aspects of the presently disclosed subject matter may be implemented. In other words, the subscription service of FIGS. 5-8, for example, can be work together with this console (but it will be appreciated by those of skill in the art that it could also be implemented on the open, PC side).

The multimedia console 100 has a central processing unit (CPU) 101 having a level 1 (L1) cache 102, a level 2 (L2) cache 104, and a flash ROM (Read-only Memory) 106. The level 1 cache 102 and level 2 cache 104 temporarily store data and hence reduce the number of memory access cycles, thereby improving processing speed and throughput. The flash ROM 106 may store executable code that is loaded during an initial phase of a boot process when the multimedia console 100 is powered. Alternatively, the executable code that is loaded during the initial boot phase may be stored in a FLASH memory device (not shown). Further, ROM 106 may be located separate from CPU 101. Any of these resources can aid in the transportation of content between closed and other computing devices.

This console may have a variety of other resources available to it, such as, a graphics processing unit (GPU) 108 and a video encoder/video codec (coder/decoder) 114 from a video processing pipeline for high speed and high resolution graphics processing. In this setup, data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 and CPU 101 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory unit 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless interface components including an Ethernet card, a modem, a Bluetooth module, a cable modem, and the like which could be used to maintain a synchronized subscription service (i.e. having the console updated with subscription service servers).

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 126 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered on or rebooted, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100. For instance, users could use a graphical user interface to connect to the aforementioned subscription service.

The multimedia console 100 may be operated as a standalone system by simply connecting the system to a television or other display, also using the aforementioned communication mechanism. In this standalone mode, the multimedia console 100 may allow one or more users to interact with the system, watch movies, listen to music, and the like. However, with the integration of broadband connectivity made available through the network interface 124 or the wireless adapter 148, the multimedia console 100 may further be operated as a participant in a larger network community.

The multimedia console depicted in FIG. 10 is a typical multimedia console that may be used to execute a multimedia application, such as, for example, a game. Multimedia applications may be enhanced with system features including for example, system settings, voice chat, networked gaming, the capability of interacting with other users over a network, e-mail, a browser application, etc. Such system features enable improved functionality for multimedia console 100, such as, for example, players in different locations can play a common game via the Internet. Thus, the communication mechanism can not only provide unsigned gaming content, but these system features (voice chat, e-mail, etc.).

Also, over time, system features may be updated or added to a multimedia application via a communication mechanism (viz. subscription features). Rather than requiring the multimedia developer to make significant modifications to the multimedia application to provide these system features, the systems and methods described herein allow a multimedia developer to provide system features through separate system applications that work in conjunction with the multimedia application. For example, a system application may embody functionality related to networked capabilities, thereby enabling a multimedia application to be readily adapted to provide networked capabilities with little work by the multimedia (e.g., game) developer. One such capability is that of system level notifications for multiple and networked users. Making system level notifications part of a system application as opposed to being handled by individual multimedia applications, such as games running on the system, takes handling displaying notifications such as game invitations out of the development process for multimedia application developers and allows them to focus on the multimedia application itself.

As mentioned above, while exemplary embodiments of the present subject matter have been described in connection with various computing devices and network architectures, the underlying concepts may be applied to any computing device, system, or communication mechanism in which an input device may be utilized to control the device or system (whether locally or remotely). For instance, the algorithm(s) and hardware implementations of the discussed aspects may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting.

As mentioned, the various techniques described herein may be implemented in connection with hardware or software or, where appropriate, with a combination of both. Thus, the methods and apparatus of the present subject matter, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed aspects. In the case of program code execution on programmable computers, the computing device generally includes a processor, a storage medium readable by the processor (including volatile and non-volatile memory and/or storage elements), at least one input device, and at least one output device. One or more programs that may implement or utilize any software provided in accordance with the these aspects are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the presently disclosed aspects may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the presently disclosed subject matter. When implemented on a general-purpose processor, the program code combines with the processor to provide a unique apparatus that operates to invoke the functionality of the present subject matter. Additionally, any storage techniques used in connection with the present aspects may invariably be a combination of hardware and software.

While the aspects described above have been described in connection with the preferred embodiments of the various figures, it is to be understood that other similar embodiments may be used or modifications and additions may be made to the described embodiment for performing the same function without deviating therefrom. For example, one skilled in the art will recognize that the methods, as described in the present application may apply to any computing device or environment, such as a gaming console, handheld computer, portable computer, etc., whether wired or wireless, and may be applied to any number of such computing devices connected via a communications network, and interacting across the network with the mentioned subscription service.

Furthermore, it should be emphasized that a variety of computer platforms, including handheld device operating systems and other application specific operating systems are contemplated herein as interfacing with the subscription service, especially as the number of wireless networked devices continues to proliferate. Still further, functionality of the present subject matter may be implemented in or across a plurality of processing chips or devices, and storage may similarly be effected across a plurality of devices. Therefore, the presently discussed aspects should not be limited to any single embodiment, but rather should be construed in breadth and scope in accordance with the appended claims.

SUMMARY

In short, various methods, systems, and computer readable can embody the various aspects discussed above. As was mentioned above with regard to other figures, such as FIG. 8, unsigned software content components (e.g. user or developer made games) can be provided to the closed computing device via a connection mechanism from a computing device and can run on such a closed computing device, subject to restrictions from a subscription service. One way to enforce such restrictions is to allow only paid gamer tag users to play unsigned gaming content in conjunction with the various heuristics mentioned above. This Summary, of course, is not limiting but merely exemplary. It is apparent that other aspects not discussed herein but discussed above, such different ways of delivering unsigned content to subscribers, are also contemplated herein albeit not explicitly mentioned in this Summary.

The invention claimed is:

1. A method for playing unsigned content on a closed computing device, comprising:
   initiating play of the unsigned content on the closed computing device by a user having a gamer tag associated with the closed computing device;
   after the initiation of play, requesting, over a network to which the closed computing device is connected, from a subscription service whether the gamer tag has an associated account with said subscription service, wherein said account specifies whether the user of said gamer tag can play unsigned content; and
   making a determination as to whether said user associated with said gamer tag can play said unsigned content on said closed computing device.

2. The method according to claim 1, wherein said checking is performed on the closed computing device on which said gamer tag resides, and where said closed computing device is configured to run said unsigned content.

3. The method according to claim 1, wherein said subscription service is located remotely from a closed computing device performing said checking and configured to run said unsigned content.

4. The method according to claim 1, wherein said gamer tag is configured to be used across a plurality of closed computing devices configured to run said unsigned content.

5. The method according to claim 1, wherein said determination is made based on at least one heuristic related to content of said unsigned content.

6. The method according to claim 1, wherein said determination is subject to being changed by said subscription service upon an action of the user associated with said gamer tag.

7. A system for playing unsigned content, comprising:
   a computing device comprising a processor and memory in communication with said processor when the system is operational;
   the computing device capable of retrieving instruction from the memory for execution by said processor, upon execution of the instructions by said processor:
   determining by way of a subscription service whether a user associated with a gamer tag has an account with said subscription service before playing unsigned content;
   upon determining that the user has the account, determining whether the account specifies that said user associated with the gamer tag can play unsigned content; and
   upon determining that the account specifies that said gamer tag can play said unsigned content, causing play to start.

8. The system according to claim 7, wherein said determining is performed on the system and said gamer tag is stored on the system, and where said system is a closed device configured to run said unsigned content.

9. The system according to claim 8, wherein said subscription service is located remotely from the system.

10. The system according to claim 7, wherein said gamer tag is configured to be used across a plurality of closed computing devices configured to run said unsigned content.

11. The system according to claim 7, wherein said determining is based on at least one heuristic related to the content of said unsigned content.

12. The system according to claim 7, wherein said determining is subject to being changed by said subscription service upon an action of a user associated with said gamer tag.

13. A computer readable storage medium bearing computer executable instructions for playing unsigned content on closed computing devices, comprising:
   first instructions for checking with a subscription service as to whether a gamer tag has an account with said subscription service before unsigned content is permitted to play on a closed console, wherein said account specifies whether said gamer tag can play unsigned content;
   second instructions for making a determination as to whether said gamer tag can play said unsigned content based on the specification in the account that user associated with the gamer tag can play unsigned content; and
   third instruction for authorizing a play of the unsigned content.

14. The computer readable medium according to claim 13, wherein said first instruction is performed on a closed console on which said gamer tag resides, and where said closed console is configured to run said unsigned content.

15. The computer readable medium according to claim 13, wherein said gamer tag is configured to be used across a plurality of closed consoles configured to run said unsigned content.

16. The computer readable medium according to claim 13, wherein said second instruction is executed based on at least one heuristic related to a content of said unsigned content.

17. The computer readable medium according to claim 13, wherein said second instruction is subject to being changed by said subscription service upon an action of the user associated with said gamer tag.

* * * * *